United States Patent [19]

Manske et al.

[11] 4,132,186
[45] Jan. 2, 1979

[54] FREEZE INDICATING DEVICE

[75] Inventors: Wendell J. Manske, Birchwood Village; Paul M. Hawkins, Afton, both of Minn.

[73] Assignee: Minnesota Mining and Manufacturing Company, Saint Paul, Minn.

[21] Appl. No.: 846,726

[22] Filed: Oct. 31, 1977

[51] Int. Cl.² .............................................. G01K 5/32
[52] U.S. Cl. .................................................. 116/216
[58] Field of Search .............................. 73/368, 368.3; 116/114 V, 114 Y, 114.5

[56] References Cited

U.S. PATENT DOCUMENTS

| | | | |
|---|---|---|---|
| 3,055,759 | 9/1962 | Bosby et al. | 116/114.5 |
| 3,435,682 | 4/1969 | Linke | 73/368.3 X |
| 3,631,721 | 1/1972 | Nollen et al. | 73/368.3 |
| 3,884,072 | 5/1975 | Cheng | 73/215 |

FOREIGN PATENT DOCUMENTS 2224360  12/1973  Fed. Rep. of Germany .......... 116/114

*Primary Examiner*—Herbert Goldstein
*Attorney, Agent, or Firm*—Cruzan Alexander; Donald M. Sell; James A. Smith

[57] ABSTRACT

A freeze indicating device which provides a visible record when it has been exposed to a specified low temperature such as 0° C. The indicator utilizing a two-chamber, constant volume device, one chamber having a variable volume and another chamber being expandable upon freezing of an aqueous liquid therein. The expansion of the aqueous fluid transmitting pressure to the fluid in the variable volume chamber, thus forcing some of its fluid through a capillary passage onto a visible indicator.

11 Claims, 5 Drawing Figures

U.S. Patent     Jan. 2, 1979     4,132,186
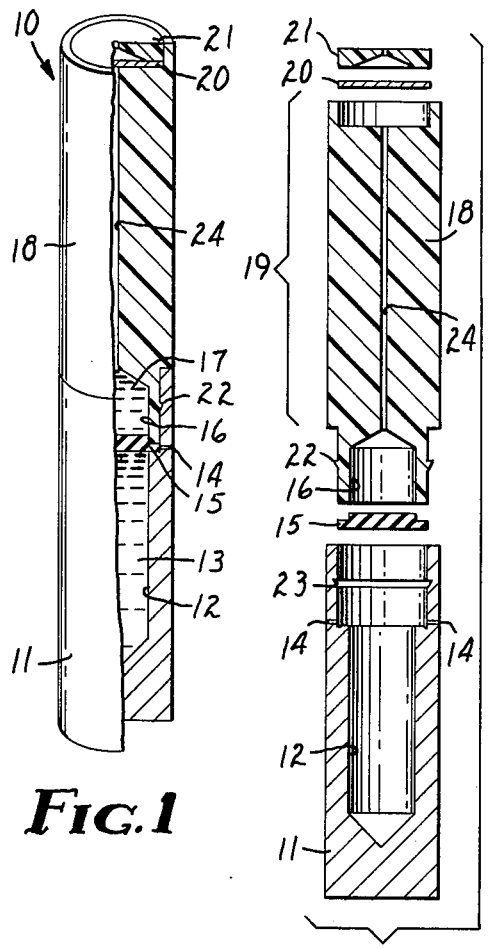
FIG. 1
FIG. 2
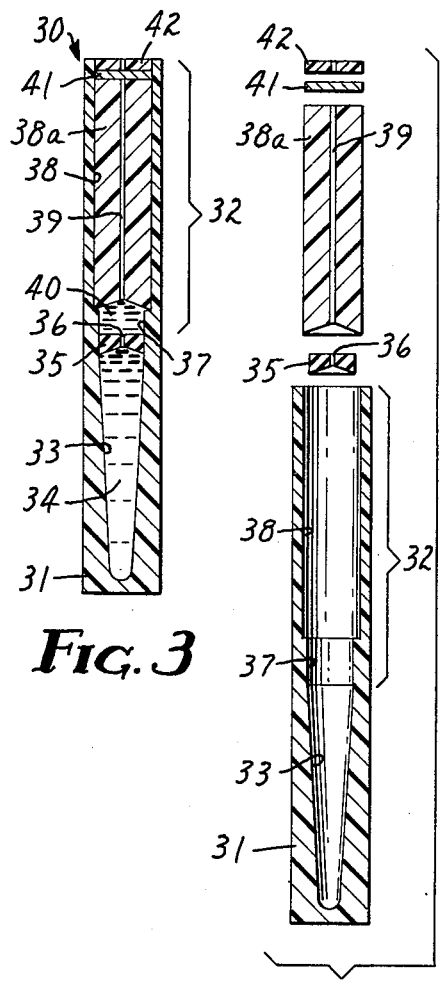
FIG. 3
FIG. 4
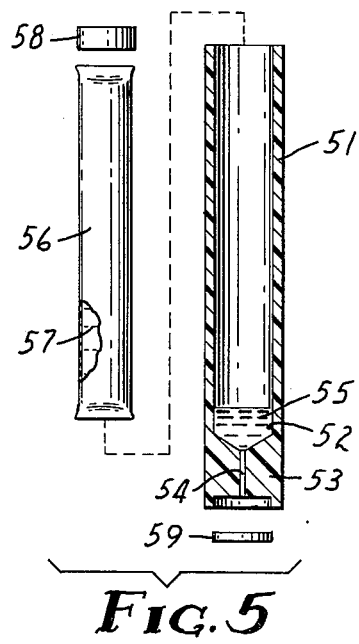
FIG. 5

FREEZE INDICATING DEVICE

The present invention relates to indicating devices which provide a visible record when they have been exposed to a specified low temperature such as 0° C.

Such indicating devices are often attached to perishable items to indicate if the items have been subjected to a freezing or excessively low temperature. In the case of certain temperature sensitive food stuffs and other perishable articles of commerce, exposure to freezing temperatures may not be immediately determinable. It may take a time period for the damage that results from such exposure to become recognizable, by which time the item may be on the marketer's shelf. The freeze indicating device provides a visible record when the article is exposed to a freezing temperature so that the item may be removed from commerce before it reaches the end user.

Various freeze indicating devices are known in the prior art. Some use encapsulated milky latexes, which upon exposure to a specified low temperature, will exhibit a change in turbidity or opacity. Others use encapsulated fluids of a certain pH immersed in a medium containing a pH indicator which will exhibit a color change if it contacts the selected fluid. Upon freezing, the selected fluid expands, breaks the capsule wall and causes a color change in the medium.

Prior art freeze indicating devices have certain disadvantages. Those utilizing a milky latex fail to provide such a dramatic change in turbidity that would enable one to make an immediate determination of whether freezing has occurred. Those including an encapsulated fluid and a pH indicating medium often do not respond consistently when freezing occurs, possibly because such small quantities of fluids are encapsulated that the wall of the capsules are elastic enough to compensate for the expansion of the fluid upon freezing without rupturing.

The present invention has overcome the aforementioned disadvantages by providing a simple, compact, and reliable freeze-indicating device. The device can be conveniently attached to an article of commerce and its permanent freeze indicating surface is easily visible.

The freeze indicating device according to the present invention comprises a constant total volume container having a first chamber and a second chamber; the first chamber having a reservoir portion and an elongated portion with a passage communicating at one end with the reservoir portion and venting to the exterior of the device at the other end; the second chamber and the reservoir portion of the first chamber being separated from one another by a displaceable liquid impermeable barrier preferentially liquid impermeable barrier; an aqueous first liquid in the second chamber; a second liquid substantially filling the reservoir portion of the first chamber and having a fluid character at the freezing point of the aqueous first liquid; a visible indicating material for the second liquid at the vented end of the passage; the length of the passage and the position of said indicating material being such that upon freezing of the aqueous first liquid, the second liquid in the reservoir is forced through the passage and into contact with the visible indicating material.

The present invention will be more clearly understood by reference to the following drawings wherein like numbers refer to like parts in the several views and wherein:

FIG. 1 is a perspective view of a preferred freeze indicating device according to the present invention, having parts broken away to show details;

FIG. 2 is an exploded cross-sectional view of the freeze indicating device of FIG. 1.

FIG. 3 is a cross-sectional view of first alternate embodiment of a freeze indicating device according to the present invention.

FIG. 4 is an exploded view of the invention of the freeze indicating device of FIG. 3.

FIG. 5 is an exploded cross-sectional view of a second alternate embodiment of a freeze indicating device according to the present invention.

Referring now to FIGS. 1 and 2 therein a freeze indicating device according to the present invention generally designated by the reference numeral 10. Briefly, the freeze indicating device 10 is shown comprising a constant total volume container consisting of a base 11 containing a second chamber 12 and a polymeric tube 18 containing a first chamber comprising a reservoir portion 16 and an elongated portion 19 having a passage means 24 communicating at one end with the reservoir portion 16 and venting to the exterior of the device at the other end. The base 11 is made of metal, preferably aluminum, while the polymeric tube 18 is a transparent polycarbonate, although many other materials are acceptable. The reservoir portion 16 of the polymeric tube 18 is substantially filled with a second liquid 17, e.g., mineral oil, which preferably also fills a portion of the passage 24. A displaceable barrier 15 is fitted into the polymeric tube 18 so as to seal the reservoir portion 16. This displaceable barrier can be any suitable material but preferably a flexible material such as a plastic film or a rubbery material such as neoprene, which will remain flexible at the freezing temperature of the aqueous first liquid 13 and be easily displaceable by the expansion that results in the second chamber 12.

The second chamber 12 is filled with an aqueous first liquid 13, e.g., water having crystals of solid silver iodide present. The polymeric tube 18 with the displaceable barrier 15 in place is joined to the aqueous liquid filled base 11 by the insertion and mating of the locking channel 23 located in the base 11 onto the locking rim 22 located on the polymeric tube 18. Weep holes 14 are positioned in the base 11 to allow air and excess water to escape during the mating.

At the vented end of the polymeric tube 18 a visible indicating material 20 is fitted. The indicating material 20 may be any material on which will change substantially in appearance or color when the second liquid 17 comes into contact with it. This material is preferably white blotting paper. After the indicating material 20 is positioned, a seal is formed by inserting a vented transparent end cap 21, sealing the venting end of the polymeric tube 18.

FIGS. 3 and 4 show an alternate embodiment of a freeze indicating device 30 comprising a constant total volume container 31 having a first chamber 32 and a second chamber 33. This container may be made of numerous polymeric materials or metals, e.g., aluminum. The second chamber 33 is filled with an aqueous first liquid 34, e.g., water with crystals of solid silver iodide, and a displaceable barrier 35 is then positioned so as to separate the first chamber 32 from the second chamber 33.

The barrier 35 is a free piston made preferably of neoprene rubber. It has a venting means 36 which allows air to escape during insertion but fluids are passed with substantial difficulty. The insertion of the barrier 35 results in the second chamber 33 being void of air pockets.

The first chamber 32 having a reservoir portion 37 and an elongated portion 38 with a passage means 39 communicating at one end with the reservoir portion 37 and then vented to the exterior of the indicating device at the other end. A second liquid 40 is introduced such that reservoir portion 37 is substantially filled.

An insert 38a, having a passage means 39, is press fitted into the elongated portion 38 of the constant total volume container 31. A visible indicating material 41 is placed at the venting end of the capillary means 39. A venting transparent end cap 42 is placed onto the venting end of the constant total volume container 31.

FIG. 5 shows a second alternative embodiment of the freeze indicating device comprising a constant total volume container 51 having a first chamber consisting of a reservoir portion 52 and an elongated portion 53 with a capillary passage 54 communicating at one end with the reservoir portion 52 and vented to the exterior of the freeze indicating device. The first chamber is substantially filled with a second liquid 55. An expandable plastic bag 56 forms a displaceable barrier and a second chamber. This plastic bag 56 can be formed by heat sealing one end of polyvinyl chloride tubing (Bev-A-Line, a trade-marked product of Thermoplastic Processes, Inc., Stirling, N.J.). The open end of the bag 56 is filled with an aqueous first liquid 57, and the open end is then heat sealed. The fully sealed bag is placed in the reservoir portion 52. An end plug 58 is then inserted into the end of the constant total volume container 51. A visible indicating material 59 is placed at the venting end of the passage means 53.

The indicating devices of the present invention are particularly adapted to record the exposure to freezing temperatures. This is accomplished by providing a unique two chamber, constant volume device, one chamber having a variable volume and another chamber being expandable upon freezing of the aqueous liquid therein, the expansion of the aqueous fluid transmitting pressure to the fluid in the variable volume chamber, thus forcing some of its fluid through a capillary passage onto a visible indicator.

The devices of the present invention are based on the concept that there is approximately a 9% volume increase when water freezes. The indicator device, by having an expandable second chamber containing an aqueous fluid, utilizes the expansion that results from the freezing to move a displaceable barrier. Because the barrier is also in intimate contact with the liquid in the reservoir of the first chamber, the displacement of the barrier forces a portion of that liquid to flow through the capillary passage, which magnifies the linear movement, and eventually brings the liquid into contact with the indicating material, leaving a visual record.

The indicator of the present invention offers a degree of freedom in the selection of the particular freezing temperature that should be recorded. This is accomplished by varying the composition of the aqueous liquid. The freezing point recorded would be dependent on the substituents present in the aqueous liquid, e.g., ethylene glycol, etc. The preferred embodiment for measuring the normal freezing point of water (0° C) would use water with crystals of silver iodide to help prevent super cooling. It is understood that any material, which exhibits the property of expansion upon subjection to a specified low temperature may be substituted for the aqueous liquid and utilized in the indicating device of the present invention.

The liquid utilized in the first chamber's reservoir, i.e. reservoir fluid, should exhibit a free flowing character at the freezing point of the aqueous liquid. It should be nonvolatile, nontoxic and also be capable of leaving a visual record when it comes in contact with the indicating material, preferably a permanent record. This can be the result of the natural staining ability of the liquid in the reservoir, the presence of a dye or pigment in the reservoir liquid, or a chemical reaction occurring between the indicating material and the reservoir liquid. The generally preferred reservoir liquid is an oil, such as Pennzoil TM gear lubricant 4096 SAE 85W-90 a product of Pennzoil United Inc., Falling Rock, W. VA. dyed with Sudan red dye a product of General Aniline Film Co., New York, N.Y. Especially preferred reservoir liquid is a dye containing substance which has a deformable plastic consistency, e.g., grease. The use of such a substance prevents the reservoir fluid's premature contact with the indicating material as a result of the jarring of the device.

The indicating material employed must be susceptible to visual marking by the reservoir liquid. The indicating material can be made of fibrous materials, woven or non-woven, with natural or synthetic fibers. Open-celled urethane foam can also be used. Generally preferred are the cellulosic materials, especially white blotting paper, when the reservoir fluid carries a dissolved or dispersed dye or pigment.

The constant total volume container may have various shapes which are dictated by the temperature sensitive articles with which the indicator is to be used. For example, it may be rectangular or circular in cross section with the latter being the preferred embodiment. The constant total volume container may be made of any material that is rigid and resists cracking or fracture when the aqueous liquid freezes and expands. Metals and polymers or a combination of both may be suitable, e.g., aluminum and polycarbonate. It is preferred that the second chamber be encased in metal because of the metal's higher thermal conductive capabilities. This higher thermal conductivity enhances the accurate transmission of the surrounding environmental conditions to the aqueous liquid located in the second chamber.

What is claimed is:
1. A freeze indicating device comprising:
  (a) a constant total volume container having a first chamber;
  (b) said first chamber having a reservoir portion and an elongated portion with a passage communicating at one end with said reservoir portion and at the other end of said device with an indicating material;
  (c) a second chamber having an expandable wall, said second chamber located within the reservoir of said first chamber;
  (d) an aqueous first liquid in said second chamber;
  (e) a second liquid substantially filling said reservoir portion of the first chamber and having a fluid character at the freezing point of said aqueous liquid;
  (f) a visible indicating material for said second liquid at the vented end of said passage; and
  (g) the length of said passage and the position of said indicating material being such that upon the freezing and expansion of said aqueous liquid, the sec- ond liquid in said reservoir is forced through said passage and into contact with said visible indicating material.

2. The indicating device of claim 1 wherein said second liquid is an oil.

3. The indicating device of claim 1 wherein said second liquid is a substance having a deformable plastic consistency.

4. The indicating device of claim 1 wherein said second liquid contains a colorant capable of staining said visible indicating material.

5. The indicating device of claim 1 wherein said aqueous liquid in the second chamber consists of $H_2O$ in the presence of solid crystals of AgI.

6. The indicating device of claim 1 wherein said visible indicating material is white blotting paper.

7. The indicating device of claim 1 wherein said constant volume container is plastic.

8. The indicating device of claim 1 wherein said constant volume container is an elongated metal cylinder.

9. The indicating device of claim 8 wherein said constant volume container is aluminum.

10. The indicating device of claim 1 wherein a vented transparent end cap covers said indicating material and forms a seal at the vented end of said capillary passage.

11. The indicting device of claim 1 wherein said second chamber having an expandable wall is an expandable plastic bag.

* * * * *